United States Patent [19]

Wills

[11] 4,078,393

[45] Mar. 14, 1978

[54] CONTROL SYSTEM FOR CONTROLLING THE OPERATION OF A THREE-PHASE LOAD

[75] Inventor: Frank E. Wills, York, Pa.

[73] Assignee: Borg-Warner Corporation, Chicago, Ill.

[21] Appl. No.: 647,826

[22] Filed: Jan. 9, 1976

[51] Int. Cl.$^2$ ............................................. F25B 39/04
[52] U.S. Cl. .................................. 62/184; 307/252 B; 318/227; 323/21; 62/186
[58] Field of Search .............................. 318/227, 230; 62/183–186; 307/252 B, 311; 323/19, 21, 24, 34

[56] References Cited

U.S. PATENT DOCUMENTS

| | | | |
|---|---|---|---|
| 3,381,212 | 4/1968 | Peltola et al. | 323/21 |
| 3,384,801 | 5/1968 | Rodgers | 318/227 X |
| 3,415,071 | 12/1968 | Kompelien | 318/227 X |
| 3,436,645 | 4/1969 | Johnson et al. | 318/227 X |
| 3,437,911 | 4/1969 | Gutzwiller | 318/227 X |
| 3,613,391 | 10/1971 | Harter | 62/183 |
| 3,633,095 | 1/1972 | Hood | 323/24 |

*Primary Examiner*—Gene Z. Rubinson
*Attorney, Agent, or Firm*—James E. Tracy

[57] ABSTRACT

The phases of a three-phase AC power supply are applied to a three-phase load, such as a motor, by respective ones of three triacs. Three alternating voltages, phase-displaced by 120°, appear across the triacs. When each alternating voltage is in its half cycles of one polarity, for example when the main terminal T$_2$ is negative relative to the main terminal T$_1$ of the triac to which the voltage is applied, the triac conducts continuously. During the half cycles of the opposite polarity, however, the conduction angle or time of each triac is varied in response to a control effect. In this way, the magnitude of the phase voltages applied to the load are varied to control the operation of the load, such as to vary the speed of the motor. No neutral point exists for the load currents so a triac, during the negative excursion of its main terminal T$_2$, cannot conduct unless the terminals T$_2$ of the other two triacs are in a positive excursion and have been triggered into conduction. A feedback arrangement insures that for a given control effect any undesired variations of the load voltages will be balanced out or compensated.

14 Claims, 2 Drawing Figures

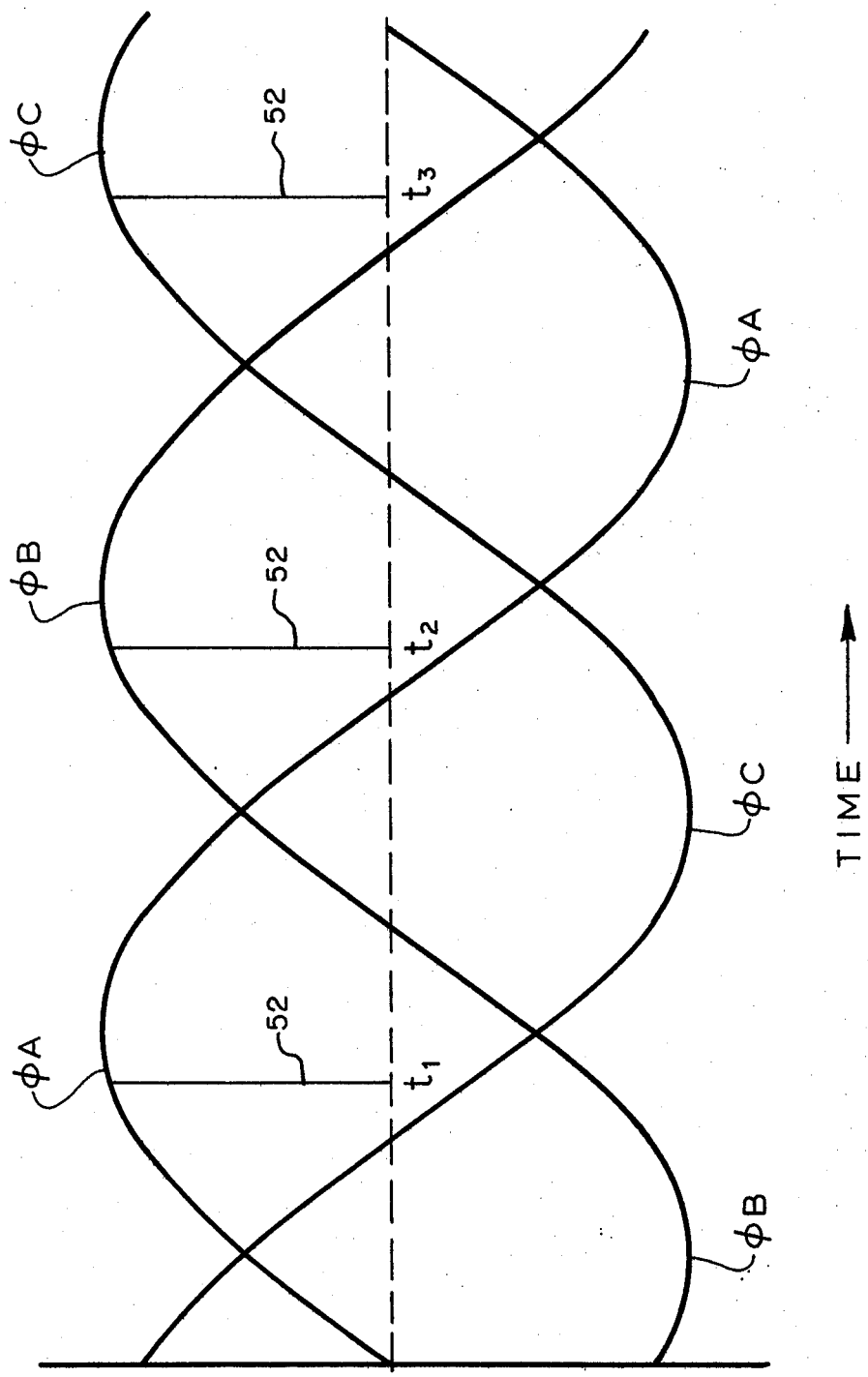

CONTROL SYSTEM FOR CONTROLLING THE OPERATION OF A THREE-PHASE LOAD

BACKGROUND OF THE INVENTION

This invention relates to a control system for controlling the delivery of three-phase power to a load in order to regulate the operation thereof. While the invention may be employed in any three-phase electrical system where it is desired to control the application to a load of three phase-displaced alternating voltages, it is particularly attractive in controlling the operation of a three-phase motor. Moreover, the invention is especially useful in an air-conditioning system for modulating the speed of a three-phase fan motor for an air-cooled condenser coil in response to the temperature of the refrigerant in the condenser coil, the speed varying directly with temperature, in order to maintain a substantially constant condenser pressure despite wide variations in condenser cooling air temperature. Accordingly, the invention will be described in the environment of an all-weather air-conditioning system which is required to operate in the presence of a broad range of outside ambient temperatures.

The condenser coil of an air-conditioning system is usually located out-of-doors or in heat exchange relation with outdoor air and is therefore subjected to widely varying ambient temperatures. If the system operates during cold weather, the outdoor temperatures may drop sufficiently low to materially reduce the condensing temperature of the refrigerant in the condenser coil. This produces a corresponding reduction in head pressure on the high pressure side of the refrigeration system, resulting in a decreased pressure differential across the thermal expansion valve or other refrigerant metering device in the system. Because of the reduced pressure difference across the metering device, less refrigerant flows from the condenser to the evaporator. The capacity of the refrigeration system is accordingly reduced and the cooling load placed on the evaporator may not be satisfied.

In some instances, the reduction in head pressure at low ambient temperatures may result in the evaporator coil being cooled to a temperature below freezing, allowing condensed moisture to freeze on the evaporator coil. As the layer of ice builds up on the evaporator coil, the coil becomes insulated from the refrigeration load and a further reduction in system capacity occurs.

Systems have been developed for preventing a pressure drop on the high pressure side of the refrigeration system, thereby to maintain the minimum pressure differential across the metering device required for efficient operation, by reducing the speed of at least one fan motor for the condenser as the ambient temperature falls. The volume of air blown across the condenser coil therefore decreases and this limits the amount of heat that can be extracted from the refrigerant as it passes through the condenser coil, insuring that the refrigerant temperature, and consequently its pressure, does not fall below the required minimum. With the pressure on the high side of the system at or above the minimum, the pressure difference across the expansion or metering device will be at or above the level necessary for efficient operation.

The present invention also maintains a minimum head pressure by keying the speed of a three-phase fan motor to condensing temperature. The motor control functions are achieved by means of a control system considerably simpler, more reliable, compact, and less expensive than those developed heretofore. Moreover, the present control system exhibits a significant improvement in performance over the prior systems. Furthermore, it is immune to instabilities due to application problems such as noise, phase rotation, power factor, line voltage, phase unbalance, line transients and line frequency.

SUMMARY OF THE INVENTION

The control system of the invention controls the coupling of a three-terminal, three-phase AC power supply to a three-terminal, three-phase balanced load, such as a variable speed condenser fan motor having wye-connected windings, in order to regulate the operation of the load. There are first, second and third triacs each of which, when conductive, connects a respective one of the power supply terminals to a respective one of the load or motor terminals. With this arrangement, phase-displaced alternating voltages will appear across the triacs. Means are provided for triggering each of the triacs into conduction when the alternating voltage thereacross is in its half cycles of one polarity, such as when the triac's main terminal $T_2$ is negative relative to its terminal $T_1$. Control means are included for varying the conduction angle of each of the triacs when the alternating voltage thereacross is in its half cycles of the opposite polarity, namely during its positive half cycles, thereby varying the magnitude of the phase voltages applied to the load to regulate the operation thereof. More specifically, the control means responds to the refrigerant temperature in the condenser coil and varies the phase voltages applied to the windings of the three-phase condenser fan motor in direct proportion to temperature. As a result, the fan motor is driven at a speed directly proportional to the condensing temperature.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which:

FIG. 2 depicts certain voltage waveforms helpful in understanding the operation of the control system.

DESCRIPTION OF THE ILLUSTRATED EMBODIMENT

Figure 1:
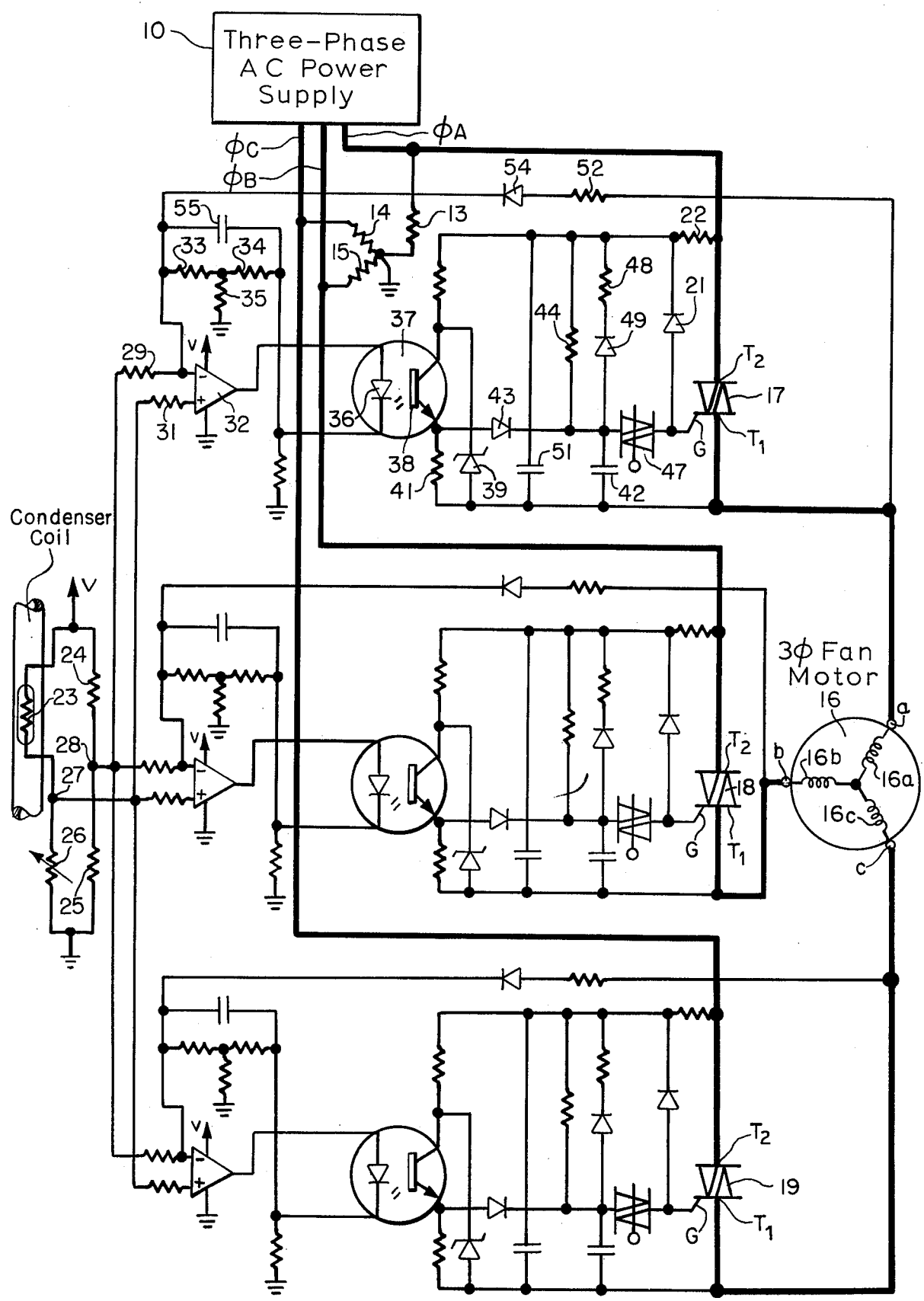
FIG. 1 schematically illustrates a control system, constructed in accordance with one embodiment of the invention, and the manner in which the control system is incorporated in a refrigeration system for controlling the condenser pressure.

Block 10 represents a conventional three-phase AC power supply having three terminals each of which provides an alternating voltage, varying in sinusoidal fashion, of the same RMS or root-mean-square amplitude (for example, 220 volts or 440 volts) and the same commutating frequency of 60 cycles per second or hertz, the three alternating voltages being phase-displaced with respect to each other by 120°. For convenience, the three phase voltages are designated phases A, B and C (or $\phi A$, $\phi B$ and $\phi C$) as indicated by the labels attached to the three output line conductors of power supply 10. Since there is no neutral line from the power supply, each of the phase voltages is actually a line-to-line voltage and appears or is produced at one terminal of power supply 10 relative to another of its terminals. For reasons to become apparent, the network of wye-connected, identical resistors 13, 14 and 15, whose center or neutral tap is connected to a ground plane of reference potential, creates an artificial common or neutral to which all of the control signals are referenced or tied. The load currents, however, do not flow through the artificial common since the load has no neutral point.

For convenience in describing the invention, the three voltages provided by power supply 10 may also be referenced to the artificial common or ground. The voltages would still be phase-displaced with respect to each other by 120°, as illustrated by the sine waves shown in FIG. 2. Each sinusoidal waveform depicts one of the phase voltages as measured or viewed with respect to the artificial neutral. The associated labels indicate the power supply terminals where each voltage is found. Specifically, the leading phase voltage in point of time is marked $\phi A$ and is found, of course, on the line conductor marked $\phi A$ relative to ground. Lagging by 120° is sinusoidal voltage waveform $\phi B$ which is that appearing on the $\phi B$ line conductor with respect to ground. Lagging the voltage $\phi B$ by 120° is voltage $\phi C$, measured at line $\phi C$ as referenced to the artificial common or neutral. As will be seen, when power supply 10 is connected to a three-phase, wye-connected load, each of voltages $\phi A$, $\phi B$ and $\phi C$ appears across a respective one of the three legs of the load.

The three terminals of AC power supply 10 are coupled to respective ones of terminals $a$, $b$ and $c$ of three-phase load 16 via respective ones of triacs 17, 18 and 19. The relatively thick or heavy lines in the drawing illustrating these connections indicate the circuit paths through which the load currents flow. Load 16 constitutes a variable speed, three-phase fan motor for a condenser, each of the motor terminals $a$, $b$ and $c$ being connected to a respective one of the three motor windings 16a, 16b and 16c. Motor 16 is preferably of the three-phase, high resistance rotor type. While only one such fan motor is shown in order to avoid encumbering the drawing, preferably several similar fan motors would be employed. They would all be connected in parallel.

Three separate control circuits identical in construction and in operation control respective ones of the three triacs in response to the same control effect. Hence, only one of the control circuits need be described in detail, the explanation applying, of course, to the other two control circuits as well. The phase A control circuit will be that which will be specifically described.

Triac 17 is of conventional construction. In the absence of any applied voltages, the triac assumes its off condition in which a very high impedance exists between its main terminals $T_1$ and $T_2$ to effectively constitute an open switch. When a voltage of either polarity is impressed across the main terminals, triac 17 will remain non-conductive until gate or triggering current of appropriate magnitude is translated between the gate terminal G and the main terminal $T_1$ in either direction, whereupon the triac turns on and permits current flow between terminal $T_1$ and $T_2$ in response to the voltage applied thereto and in the direction determined by the voltage's polarity. Once the triac is rendered conductive, a very low impedance is presented between its main terminals so that it essentially functions as a closed switch, as a consequence of which the full instantaneous $\phi A$ voltage will be applied to motor winding 16a. Conductive through the triac will continue even after the termination of the gate current so long as there is a potential difference across the main terminals. When the $T_1 - T_2$ current is reduced to zero, the triac therefore returns to its off state. Thereafter, when the voltage across the main terminals is increased from zero, conduction will not occur until gate current again flows between gate G and terminal $T_1$.

Since the triac automatically switches to its off condition each time the alternating current from the $\phi A$ line conductor crosses its AC axis, triggering current must be supplied to the gate at some instant following the beginning of each half cycle or alternation if the line conductor is to be connected to motor winding 16a. In other words, at the end of each half cycle of one polarity triac 17 assumes its non-conductive state. The polarity of the alternating voltage across the triac then changes at the start of the next half cycle, thereby requiring retriggering at the gate before the triac turns on and $T_1 - T_2$ current flow takes place.

Gate current automatically flows when the alternating voltage across triac 17 is in its half cycles of the polarity in which terminal $T_2$ is negative with respect to terminal $T_1$. During each of those negative half cycles, the gate current flows in the direction from terminal $T_1$ to terminal G and then through diode 21 and resistor 22 to the $\phi A$ line conductor. Triac 17 is therefore automatically triggered into conduction anytime terminal $T_2$ is negative relative to terminal $T_1$. During those negative alternations triac 17 exhibits the characteristics of a diode.

Conduction angle control of the triac occurs only during the opposite polarity or positive half cycles when terminal $T_2$ is positive relative to terminal $T_1$. The greater the time delay between the start of a positive half cycle and the turning on of the triac, the less the conduction time or angle of the triac and the lower the magnitude of the RMS (root-mean-square) voltage applied to motor winding 16a. Since the operating speed of motor 16 is determined by the RMS voltage applied thereto, the motor speed may be changed by varying the delay or phase angle between the beginning of each positive half cycle and the translation of gate current to triac 17. The conduction angle of the triac is equal, of course, to 180° minus the phase angle at which conduction begins. As will be explained, the control circuit for triac 17 controls the phase angle so that the speed of fan motor 16 will be a direct function of condensing temperature and thus head pressure.

To describe the control circuit for triac 17, consideration must initially be given to a portion of the system that produces a control effect or sensing signal representing the condensing temperature. A relatively low (for example, 30 volts) positive DC voltage V is applied to one terminal of a temperature sensing thermistor 23 which is firmly secured to a portion of the condenser coil in heat exchange relation in order to sense the temperature of the refrigerant in the condenser coil. One convenient way to attach the thermistor is to clamp or strap it around the refrigerant line. Thermistor 23 has a negative temperature coefficient so that its resistance is an inverse function of the condensing temperature and the head pressure in the refrigeration system. In other words, if the temperature of the refrigerant in the condenser coil increases, the resistance of thermistor 23 decreases.

Fixed resistors 24 and 25, thermistor 23 and adjustable resistor or potentiometer 26 form a wheatstone bridge. The set point of the control system, which is established by the adjustment of potentiometer 26, is the refrigerant temperature around which the system will throttle. Preferably, potentiometer 26 will be adjusted to establish the set point at approximately 100° F, with a throttling range between 95° and 105° F. When the temperature of the refrigerant in the condenser coil is 100° F, the resistance of thermistor 23 will be of a magnitude appropriate to balance the bridge; namely, the voltage drop across thermistor 23 will equal that across resistor 24, and the voltage drop across adjustable resistor 26 will be equal to that across resistor 25. Hence when the bridge is balanced circuit junctions 27 and 28 are established at the same DC potential level. Identical DC voltages are therefore applied through resistors 29 and 31 to the negative and positive inputs of differential amplifier 32 when the refrigerant is at the set point temperature and the bridge is balanced. In other words, the sensing voltage at junction 27 will be equal to the reference voltage at junction 28.

Differential amplifier 32, which may take the form of a type 741 integrated circuit operational amplifier, produces a continuous output error signal whose amplitude is proportional to the voltage difference between circuit junctions 27 and 28. As will be explained later, the amplitude of the error signal produced by amplifier 32 also depends on the amplitude of a feedback signal applied to the negative input of amplifier 32 from motor winding 16a. For the moment, however, that feedback signal will be ignored. If the refrigerant temperature in the condenser coil increases above the set point, the resistance of sensor 23 decreases and the positive DC sensing voltage at junction 27, and consequently at the positive input of differential amplifier 32, increases in a positive direction with respect to the reference voltage at the negative input of the amplifier. As a result, the error signal or output current of amplifier 32 increases. On the other hand, if the refrigerant temperature falls below the set point temperature, the resistance of thermistor 23 increases and the sensing voltage level at the positive input of amplifier 32 decreases relative to the reference level at the negative input. As a consquence, the output current of differential amplifier 32 decreases. Resistors 33, 34 and 35 limit the gain of amplifier 32 to the desired level.

The error signal or output current of differential amplifier 32 flows through the light emitting diode or LED 36 of an optically coupled isolator 37, the light emission of the LED being directly proportional to the current translated therethrough. The greater the output current from amplifier 32, the greater the light intensity. Hence, the amount of illumination of LED 36 is a direct function of the refrigerant temperature sensed by thermistor 23.

The control circuit for triac 17 includes a ramp and pedestal circuit which is controlled by optically coupled isolator 37. The collector-emitter conduction path of photosensitive transistor 38 presents a resistance determined by an inverse function of the light emission of LED 36. The greater the light emission, the less the resistance of the transistor. To understand the manner in which the ramp and pedestal circuit functions, assume that the instantaneous voltage on line conductor $\phi A$ has just crossed its AC axis and is starting a positive half cycle. When the voltage reaches around +20 volts, zener diode 39 conducts and the collector of transistor 38 remains at and is clamped to a regulated 20 volts while the instantaneous amplitude continues to increase on line conductor $\phi A$. The positive 20 volts on the collector will divide across the voltage divider provided by the collector-emitter path and resistor 41 to produce a positive DC voltage at the emitter of transistor 38 of an amplitude determined by the light emission of LED 36. Timing capacitor 42 charges instantly through diode 43 to the voltage level at the emitter, which is called the pedestal amplitude and is directly proportional to the emission of LED 36 and to the sensed temperature.

After the pedestal is reached, capacitor 42 then charges through resistor 44 until the positive-going ramp voltage reaches the threshold level of silicon bilateral switch or SBS 47, at which time the SBS breaks down and permits bidirectional current flow. Capacitor 42 therefore immediately discharges through SBS 47 and through the conduction path between terminals G and $T_1$ of triac 17. This provides gate current of sufficient magnitude to fire the triac into conduction so that the $\phi A$ voltage will be applied to motor winding 16a for the remainder of the positive half cycle, thereby causing load current to flow into motor terminal a. Of course, since there is no neutral point for motor 16, any load current flowing into terminal a must exit at terminals b and c. This is made possible since during the positive half cycles of phase A at least one of the other two phases will be in a negative half cycle which causes the associated triac to conduct in the direction away from the fan motor.

The phase angle at which triac 17 begins to conduct will therefore be determined by the time required for capacitor 41 to charge to the breakdown voltage of SBS 47, and that charging time will be inversely proportional to the refrigerant temperature sensed by thermistor 23. The greater the level of the pedestal, the faster the ramp reaches the breakdown voltage, the greater the conduction angle, the greater the RMS voltage applied to the fan motor and the greater the fan speed.

By charging capacitor 42 through resistor 44 to the unclamped sinusoidal waveform, a cosine wave is added to the linear ramp to compensate for the sinusoidal supply waveform in order to maintain linearity. In this way, perfect linearity is obtained between the LED current and the magnitude of the voltage applied to the motor.

Resistor 48 and diode 49 provide a quick discharge path during each negative alternation to assure that capacitor 42 discharges to zero at the end of each cycle. This eliminates the effects of residual charge build up from influencing triggering.

Resistor 22 in conjunction with capacitor 51 provide a $dv/dt$ suppression network, or what is commonly called a snubber network, across triac 17. In the absence of a snubber network across a triac, a fast rise in gate voltage may trigger the triac into conduction even though the gate threshold is not reached.

In order to illustrate a typical example in the waveforms of FIG. 2, the vertical lines 51 in that figure indicate the times at which the three triacs would begin conducting during the positive half cycles when the delay angle is approximately 75°, meaning that the conduction angle would be about 180° minus 75° or 105°. In other words, during the interval from time $t_1$ to the time at which waveform $\phi A$ completes its positive half cycle and crosses its AC axis, triac 17 would be conductive to supply load current into load terminal a. From time $t_2$ to the time at which waveform $\phi B$ completes its positive half cycle, triac 18 would be turned on to effect the flow of load current into terminal b, and during the interval from time $t_3$ to the completion of the positive half cycle of waveform $\phi C$, triac 19 would be triggered into conduction and load current would flow into terminal c. Note that even though the three phases are controlled independently by separate control circuits that are all tied to a common reference point, cooperation is required between all three of the triacs to translate load current through each of the motor windings.

Of course, when the condenser pressure is at its required level and the temperature of the refrigerant in the condenser coil is at the set point, the three error signals supplied to the three LED's will be of the appropriate amplitude to drive fan motor 16 at the necessary speed in order to maintain the refrigerant at that set point temperature. If the temperature, and consequently the head pressure, begin to rise, the three LED's increase their illumination and the pedestal amplitudes increase, thereby causing the three triacs to turn on at an earlier instant (smaller phase angle, greater conductive angle) following the beginning of each positivie half cycle. The RMS magnitude of each phase voltage applied to the fan motor therefore increases, with the result that the speed of the motor increases and more air is drawn across the condenser coil. This in turn lowers the refrigerant temperature down to the set point and the condenser pressure down to the required level.

Conversely, if the condensing temperature decreases below the set point temperature and the condenser pressure decreases below its required level, the light emission of each LED decreases and the pedestal levels decrease. Each triac is therefore fired into conduction at a later time (greater phase angle, smaller conduction angle) following the start of each positive half cycle and this lowers the RMS magnitude of the phase voltages applied to the fan motor, causing a reduction in speed thereof. Less air is thus circulated over the condenser coil and the refrigerant temperature is allowed to rise back to the set point and the condenser pressure returns to the required level.

A salient feature of the invention resides in the provision of a feedback arrangement for balancing out or compensating any undesired load voltage fluctuations or variations, thereby stabilizing the operation of the load when the sensed temperature is constant. Once again considering in detail only the phase A control circuit, the other two being identical, the load voltage at terminal a is applied to a half wave rectifier and filter, provided by resistor 52, diode 54 and capacitor 55, to produce a positive DC potential, representative of and proportional to the load voltage, for application to the negative input of differential amplifier 32. In effect, the +DC voltage fed back is compared with the reference voltage from junction 28 such that the voltage applied to the negative input of amplifier 32 will be a summation of both of those voltages. With this arrangement, by adjusting the ratio between resistors 29 and 52, a desired proportional relationship may be established, and will remain fixed, between the amplitude of the sensing signal at junction 27, which represents the condensing temperature, and the magnitude of the load voltage applied to winding 16a. The prescribed fixed proportional relationship between the sensing voltage and load voltage will automatically be maintained at all levels of the sensing voltage, and it is this characteristic which compensates any undesired vaiations or fluctuations in the load voltage, not caused by a change in the sensing voltage.

To explain, assume that some disturbance causes, for example, an undesired increase in the load voltage applied to winding 16a. The +DC voltage fed back to amplifier 32 therefore increases and since it is applied to the negative or inverting input of the amplifier, the error signal applied to LED 36 will decrease and this results in a decreased magnitude of the phase voltage applied to winding 16a. Hence the undesired load voltage increase is automatically cancelled out or neutralized to stabilize the operation of the motor. Of course, undesired load voltage fluctuations in phases B and C will be balanced out in the same manner.

The invention provides, therefore, a unique control system for controlling the delivery of three-phase power to a three-phase load to regulate the operation of the load in response to a control effect. It features a novel arrangement for maintaining a fixed relationship between the control effect and the load voltages in order to render the system immune to any influence tending to introduce undesired changes in the load voltages. Moreover, the invention provides a unique control system for maintaining a relatively constant condenser pressure in a refrigeration system by regulating the speed of at least one three-phase fan motor for an air-cooled condenser coil in response to the condensing temperature, the speed being a direct function of temperature.

While a particular embodiment of the invention has been shown and described, modifications may be made, and it is intended in the appended claims to cover all such modifications as may fall within the true spirit and scope of the invention.

I claim:

1. A control system for controlling the coupling of a three-terminal, three-phase AC power supply to a three-terminal, three-phase balanced load to control the application of three phase-displaced alternating voltages to the load, comprising:

coupling means for coupling the three-phase AC power supply to the load and including first, second and third triacs each of which has its main terminals $T_1$ and $T_2$ connected in series between a respective one of the three power supply terminals and a respective one of the three load terminals;

first, second and third diodes each of which is coupled between the gate terminal and the main terminal $T_2$ of a respective one of said first, second and third triacs to trigger that triac into conduction during the half cycles of one polarity when there is an alternating voltage thereacross of a predetermined polarity;

and control means for triggering each of said triacs into conduction, and for varying its conduction angle, during the opposite polarity half cycles when the alternating voltage thereacross is of the opposite polarity, thereby varying the magnitude of the phase voltages applied to the load to regulate the operation thereof, each of said triacs conducting during the half cycles of said one polarity only when at least one of the other two triacs has been triggered into conduction by said control means.

2. A control system according to claim 1 in which said control means includes first, second and third optically coupled isolators each of which controls the conduction angle of a respective one of said first, second and third triacs.

3. A control system according to claim 1 in which the main terminals $T_2$ of said three triacs connect to respective ones of the three power supply terminals, while the main terminals $T_1$ connect to respective ones of three load terminals, and in which said control means controls the conduction angle of each of said triacs during the positive half cycles when the alternating voltage on the triac's Terminal $T_2$ is positive relative to the voltage on the triac's terminal $T_1$.

4. A control system according to claim 3 in which the gate terminal of each of said triacs is connected to the triac's terminal $T_2$ via a resistor and a series-connected, respective one of said first, second and third diodes which diode is poled to conduct and trigger the triac into conduction when the voltage on terminal $T_2$ is negative relative to that on the triac's terminal $T_1$.

5. A control system according to claim 4 in which the junction of each resistor-diode circuit is coupled via a capacitor to the triac's terminal $T_1$, the resistor functioning in conjunction with the capacitor to provide a $dv/dt$ suppression network across the triac.

6. A control system according to claim 1 in which said control means includes first, second and third ramp and pedestal circuits each of which is coupled in shunt with a respective one of said first, second and third triacs and controls the conduction angle thereof.

7. A control system according to claim 6 in which the operation of each of said first, second and third ramp and pedestal circuits is controlled by a respective one of first, second and third optically coupled isolators.

8. A control system according to claim 7 in which each of said optically coupled isolators includes a light emitting diode, whose light intensity may be varied by said control means, and a photosensitive transistor optically coupled to the light emitting diode and electrically coupled to the power supply terminal to which the associated triac is connected, the emitter-collector resistance of the transistor being determined by the amount of light received from the diode, in which each of said ramp and pedestal circuits includes a timing capacitor which charges, during each half cycle when the alternating voltage across the associated triac is of said opposite polarity, to a pedestal having an amplitude determined by the emitter-collector resistance of the transistor, and in which the associated triac is triggered into conduction at an angle, following the beginning of each half cycle of said opposite polarity, determined by the pedestal amplitude.

9. A control system according to claim 1 in which feedback signals are fed back from the three load terminals to said control means to stabilize the operation of the load.

10. A control system according to claim 1 in which said control means produces a sensing signal whose amplitude represents a sensed condition associated with the load and which is subject to variation, and wherein said control means responds to said sensing signal and produces first, second and third error signals the amplitude of each of which controls the conduction angle of a respective one of said first, second and third triacs to automatically regulate the operation of the load in a manner tending to maintain the sensed condition substantially constant.

11. A control system according to claim 10 in which first, second and third feedback signals, each representing the magnitude of the phase voltage applied to a respective one of the three load terminals, vary the amplitude of respective ones of said first, second and third error signals in response to undesired variations in magnitude of the load voltages in order to maintain a fixed prescribed proportional relationship between the amplitude of the sensing signal and the magnitude of each of the three load voltages, thereby balancing out the undesired variations to stabilize the operation of the load when the sensed condition remains unchanged.

12. A control system according to claim 11 in which said first, second and third error signals are produced by respective ones of first, second and third differential amplifiers, in which said sensing signal is applied to the positive input of each of said differential amplifiers, wherein a reference signal is applied to the negative input of each of said differential amplifiers, and in which each of said first, second and third feedback signals is applied to the negative input of a respective one of said differential amplifiers.

13. A control system according to claim 11 in which the load is wye-connected without a neutral point for the load currents, wherein a network of wye-connected resistors is interconnected between the three power supply terminals, the network's center tap being connected to a ground plane of reference potential to effectively create an artificial common, and in which said three feedback signals, said three error signals and said sensing signal are all referenced with respect to said common.

14. A control system for modulating the speed of a three-terminal, three-phase, variable speed fan motor, of an air-cooled condenser coil in a refrigeration system, in response to the temperature of the refrigerant in the condenser coil in order to maintain a substantially constant condenser pressure despite wide variations in condenser cooling air temperature, comprising:

a three-terminal, three-phase AC power supply;

coupling means for coupling said three-phase AC power supply to the fan motor and including first, second and third triacs each of which has its main terminals $T_1$ and $T_2$ connected in series between a respective one of the three power supply terminals and a respective one of the three fan motor terminals;

first, second and third diodes each of which is coupled between the gate terminal and the main terminal $T_2$ of a respective one of said first, second and third triacs to trigger that triac into conduction during the half cycles of one polarity when there is an alternating voltage theracross of a predetermined polarity;

means for sensing the refrigerant temperature in the condenser coil;

and means controlled by said sensing means for triggering each of said triacs into conduction, and for varying its conduction angle, during the opposite polarity half cycles when the alternating voltage thereacross is of the opposite polarity, thereby varying the magnitude of the phase voltages applied to the condenser fan motor in order to drive the fan motor at a speed directly proportional to the temperature of the refrigerant in the condenser coil, each of said triacs conducting during the half cycles of said one polarity only when at least one of the other two triacs has been triggered into conduction.

* * * * *